US 11,268,871 B2

(12) United States Patent
Abo

(10) Patent No.: US 11,268,871 B2
(45) Date of Patent: Mar. 8, 2022

(54) DETACHABLE PRESSURE DETECTION DEVICE

(71) Applicant: Surpass Industry Co., Ltd., Saitama (JP)

(72) Inventor: Kazuo Abo, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/027,969

(22) Filed: Sep. 22, 2020

(65) Prior Publication Data

US 2021/0102858 A1  Apr. 8, 2021

(30) Foreign Application Priority Data

Oct. 2, 2019  (JP) .............................. JP2019-182197

(51) Int. Cl.
*G01L 19/00*  (2006.01)
*G01L 9/00*  (2006.01)

(52) U.S. Cl.
CPC ........ *G01L 19/0023* (2013.01); *G01L 9/0044* (2013.01); *G01L 9/0051* (2013.01)

(58) Field of Classification Search
None
See application file for complete search history.

(56) References Cited

U.S. PATENT DOCUMENTS 8,156,817 B2 *  4/2012  Kaneko .................. G01L 9/007
                                                         73/728
9,933,288 B2 *  4/2018  Imai .................... G01L 19/0023

2016/0377499 A1 * 12/2016  Imai ..................... G01L 19/0023
                                                         73/756
2017/0370792 A1 * 12/2017  Hasunuma ............ G01L 19/069
2018/0120186 A1 *  5/2018  Imai ........................ G01L 19/14
2019/0056280 A1 *  2/2019  Abo ....................... G01L 9/0044

FOREIGN PATENT DOCUMENTS

EP        3260834 A1    12/2017
EP        3315936 A1     5/2018
JP     2017009467 A      1/2017

OTHER PUBLICATIONS

Extended European Search Report dated Feb. 25, 2021 in corresponding EP Application No. 20196999.5, 7 pages.

* cited by examiner

*Primary Examiner* — Lisa M Caputo
*Assistant Examiner* — Nigel H Plumb
(74) *Attorney, Agent, or Firm* — MH2 Technology Law Group LLP

(57) ABSTRACT

Provided is a pressure detection device comprising a pressure detection unit configured to detect pressure transmitted to a pressure detecting surface; a flow passage unit including a flow passage configured to allow fluid to flow along a flow direction from an inflow port to an outflow port, and a pressure transmitting surface configured to transmit pressure of fluid flowing through the flow passage to the pressure detecting surface; and a mounting mechanism by which the flow passage unit is removably mounted on the pressure detection unit. The pressure detecting surface includes a sliding layer having a sliding property for when the pressure detecting surface comes in contact with the pressure transmitting surface.

6 Claims, 9 Drawing Sheets

DETACHABLE PRESSURE DETECTION DEVICE

CROSS-REFERENCE TO RELATED APPLICATIONS

This application is based on Japanese Patent Application No. 2019-182197, the contents of which are incorporated herein by reference in its entirety.

TECHNICAL FIELD

The present disclosure relates to a pressure detection device.

BACKGROUND ART

A conventionally known pressure detection device includes a flow passage unit provided with a pressure transmitting surface formed on a part of a flow passage that allows liquid to flow therethrough, a pressure detection unit that detects pressure transmitted to a pressure detecting surface, and a mounting mechanism by which these units are removably mounted (see, for example, Japanese Unexamined Patent Application, Publication No. 2017-9467, hereinafter referred to as Patent Literature 1).

In the pressure detection device disclosed in Patent Literature 1, the flow passage unit is removably mounted on the pressure detection unit, and thus a used flow passage unit can be replaced with a new flow passage unit.

SUMMARY

Technical Problem

The pressure detection device disclosed in Patent Literature 1 includes the mounting mechanism by which the pressure transmitting surface of the flow passage unit is brought into contact with the pressure detecting surface of the pressure detection unit, so that pressure of liquid flowing through the flow passage unit is transmitted via the pressure transmitting surface to the pressure detecting surface. To replace a used flow passage unit with a new flow passage unit, the mounting mechanism is used to remove the used flow passage unit from the pressure detection unit and mount the new flow passage unit on the pressure detection unit. During such replacement procedures, the pressure transmitting surface of the used flow passage unit is moved away from the pressure detecting surface of the pressure detection unit, and then the pressure transmitting surface of the new flow passage unit comes in contact with the pressure detecting surface of the pressure detection unit.

However, the inventors have discovered through their review that the pressure detecting property of the pressure detection unit may vary after the used flow passage unit is replaced with the new flow passage unit. For example, in some cases, different pressure values are detected by the pressure detection unit before and after the replacement even through liquid flowing through the used passage unit and liquid flowing through the new flow passage unit have the same pressure. This may be caused by variations in mounting work performed by operators to mount the flow passage unit on the pressure detection unit, which changes the state of contact between the pressure transmitting surface and the pressure detecting surface.

The present disclosure has been made under such circumstances, and it is an object of the present disclosure to provide a pressure detection device capable of reducing changes in a pressure detecting property of a pressure detection unit which are caused by variations in mounting work performed by operators.

Solution to Problem

To solve the above-mentioned problem, the present disclosure adopts the following solutions.

A pressure detection device according to one aspect of the present disclosure includes a pressure detection unit configured to detect pressure transmitted to a pressure detecting surface; a flow passage unit including a flow passage configured to allow fluid to flow along a flow direction from an inflow port to an outflow port, and a pressure transmitting surface configured to transmit pressure of fluid flowing through the flow passage to the pressure detecting surface; and a mounting mechanism by which the flow passage unit is removably mounted on the pressure detection unit. Further, at least one of the pressure detecting surface and the pressure transmitting surface includes a sliding layer having a sliding property for when the pressure detecting surface and the pressure transmitting surface come in contact with one another.

In the pressure detection device according to one aspect of the present disclosure, the flow passage unit is removably mounted on the pressure detection unit. When fluid flowing through the flow passage is changed, a used flow passage unit can be removed from the pressure detection unit to mount a new unused flow passage unit on the pressure detection unit. Consequently, there is no need to perform time-consuming cleaning of the used flow passage when fluid flowing through the flow passage is changed, thereby enabling prompt work. Further, use of the new unused flow passage unit can improve safety.

Further, in the pressure detection device according to one aspect of the present disclosure, at least one of the pressure detecting surface and the pressure transmitting surface includes the sliding layer that increases a sliding property for when the pressure detecting surface and the pressure transmitting surface come in contact with one another. Consequently, the sliding layer and another surface, which is to be in contact with the sliding layer, slidably come in contact with one another when the flow passage unit is mounted on the pressure detection unit by the mounting mechanism so as to bring the pressure transmitting surface into contact with the pressure detecting surface. The presence of the sliding layer can maintain a constant state of contact between the pressure transmitting surface and the pressure detecting surface, corresponding to displacement of the pressure transmitting surface caused by changes in fluid pressure. Thus, even with variations in mounting work performed by operators, the constant state of contact can be maintained between the pressure transmitting surface and the pressure detecting surface, thereby reducing changes in the pressure detecting property of the pressure detection unit.

The pressure detection device according to one aspect of the present disclosure is preferably configured as follows: The pressure detection unit includes a pressure sensor, which is provided with the pressure detecting surface and a base configured to hold the pressure detecting surface. The pressure detecting surface includes a sensing surface formed in a thin film shape to be mounted on the base. The sliding layer is one of a thin-film sheet member to be joined to the sensing surface, a layer formed of a material having a sliding property to be vapor-deposited on the sensing surface, and a layer formed by a surface treatment to apply a sliding property to the sensing surface.

According to the pressure detection device having the above configuration, the sliding layer can be formed by joining the thin-film sheet member to the sensing surface formed in a thin film shape and included in the pressure detecting surface of the pressure detection unit, by vapor-depositing the material having a sliding property on the sensing surface, or by providing a surface treatment to apply a sliding property to the sensing surface.

The pressure detection device according to one aspect of the present disclosure is preferably configured as follows: The flow passage unit includes a body, which is formed with the flow passage configured to extend along a first axis and an opening configured to communicate with the flow passage and open in a direction along a second axis orthogonal to the first axis. The pressure transmitting surface is joined to the body so as to close the opening.

According to the pressure detection device having the above configuration, the opening communicating with the flow passage is closed by the pressure transmitting surface. Thus, the pressure transmitting surface is displaced along the second axis by pressure of liquid that resides in a space closed by the pressure transmitting surface 22a. Such displacement of the pressure transmitting surface along the second axis is transmitted to the pressure detecting surface arranged in contact with the pressure transmitting surface and is detected as a pressure value.

The pressure detection device according to the above configuration is preferably configured as follows: The pressure transmitting surface includes a pressure receiving surface formed in a thin film shape to be joined to the body, and one side of the pressure receiving surface is configured to receive pressure of fluid flowing through the flow passage. The sliding layer is one of a thin-film sheet member to be joined to the pressure receiving surface, a layer formed of a material having a sliding property to be vapor-deposited on the pressure receiving surface, and a layer formed by a surface treatment to apply a sliding property to the pressure receiving surface.

According to the pressure detection device having the above configuration, the sliding layer can be formed by joining the thin-film sheet member to the pressure receiving surface formed in a thin film shape and included in the pressure transmitting surface of the flow passage unit, by vapor-depositing the material having a sliding property on the pressure receiving surface, or by providing a surface treatment to apply a sliding property to the pressure receiving surface.

The pressure detection device according to one aspect of the present disclosure is preferably configured as follows: The pressure detection unit includes a projection, and the pressure detecting surface is arranged on a top of the projection. The flow passage unit includes a recess, and the pressure transmitting surface is arranged on a bottom of the recess. In a state where the projection of the pressure detection unit is inserted into the recess of the flow passage unit, the flow passage unit is mounted on the pressure detection unit by the mounting mechanism.

According to the pressure detection device having the above configuration, the pressure transmitting surface is arranged on the bottom of the recess of the flow passage unit. This can prevent a failure in which an operator mistakenly touches the pressure transmitting surface when replacing the flow passage unit or in which the pressure transmitting surface comes in contact with another member and gets damaged.

The pressure detection device according to the above configuration is preferably configured as follows: The mounting mechanism is a nut rotatably mounted on the flow passage unit and including a female thread formed on an inner peripheral surface of the nut. A male thread is formed on an outer peripheral surface of the pressure detection unit, and the outer peripheral surface is located on an outer peripheral side of the projection. By engaging the female thread with the male thread, the pressure detecting surface and the pressure transmitting surface are brought into contact with one another to reach a mounting state.

According to the pressure detection device having the above configuration, the pressure detecting surface of the pressure detection unit and the pressure transmitting surface of the flow passage unit gradually approach one another while an operator rotates the nut mounted on the flow passage unit, and finally the pressure detecting surface and the pressure transmitting surface reach a mounting state. Through a relatively simple work to rotate the mounting mechanism about the second axis, the distance between the pressure detecting surface and the pressure transmitting surface can be gradually narrowed, and then these surfaces can be reliably brought into contact with one another. It is thus rather easy to reach the state of contact between the pressure detecting surface and the pressure transmitting surface, without causing a failure in which the pressure detecting surface and the pressure transmitting surface strongly come in contact with one another and get damaged.

By rotation of the nut, the pressure detecting surface and the pressure transmitting surface can be brought into contact with one another. However, the state of contact can be changed between the pressure detecting surface and the pressure transmitting surface due to variations in mounting work performed by operators to mount the flow passage unit to the pressure detection unit. For example, if the pressure transmitting surface is rotated by the nut about the second axis in a state where no sliding occurs between the pressure transmitting surface and the pressure detecting surface, then the pressure detecting surface can be partially distorted in a twist direction about the second axis.

To solve the above, in the configuration of the present disclosure, when the flow passage unit is mounted on the pressure detection unit by the mounting mechanism to bring the pressure transmitting surface into contact with the pressure detecting surface, the sliding layer and another surface, which is to be in contact with the sliding layer, slidably come in contact with one another. Thus, even with variations in mounting work performed by operators, the constant state of contact can be maintained between the pressure transmitting surface and the pressure detecting surface, thereby reducing changes in the pressure detecting property of the pressure detection unit.

In the pressure detection device according to one aspect of the disclosure, the sliding layer is preferably formed of a fluororesin material.

According to the pressure detection device having this configuration, the sliding layer formed of the fluororesin material can apply an appropriate sliding property to the sliding layer.

Advantageous Effects

The present disclosure can provide the pressure detection device capable of reducing changes in the pressure detecting property of the pressure detection unit which are caused by variations in mounting work performed by operators.

DESCRIPTION OF EMBODIMENTS

First Embodiment

With reference to the drawings, a pressure detection device 100 according to a first embodiment of the present disclosure is described below.

Figure 1:
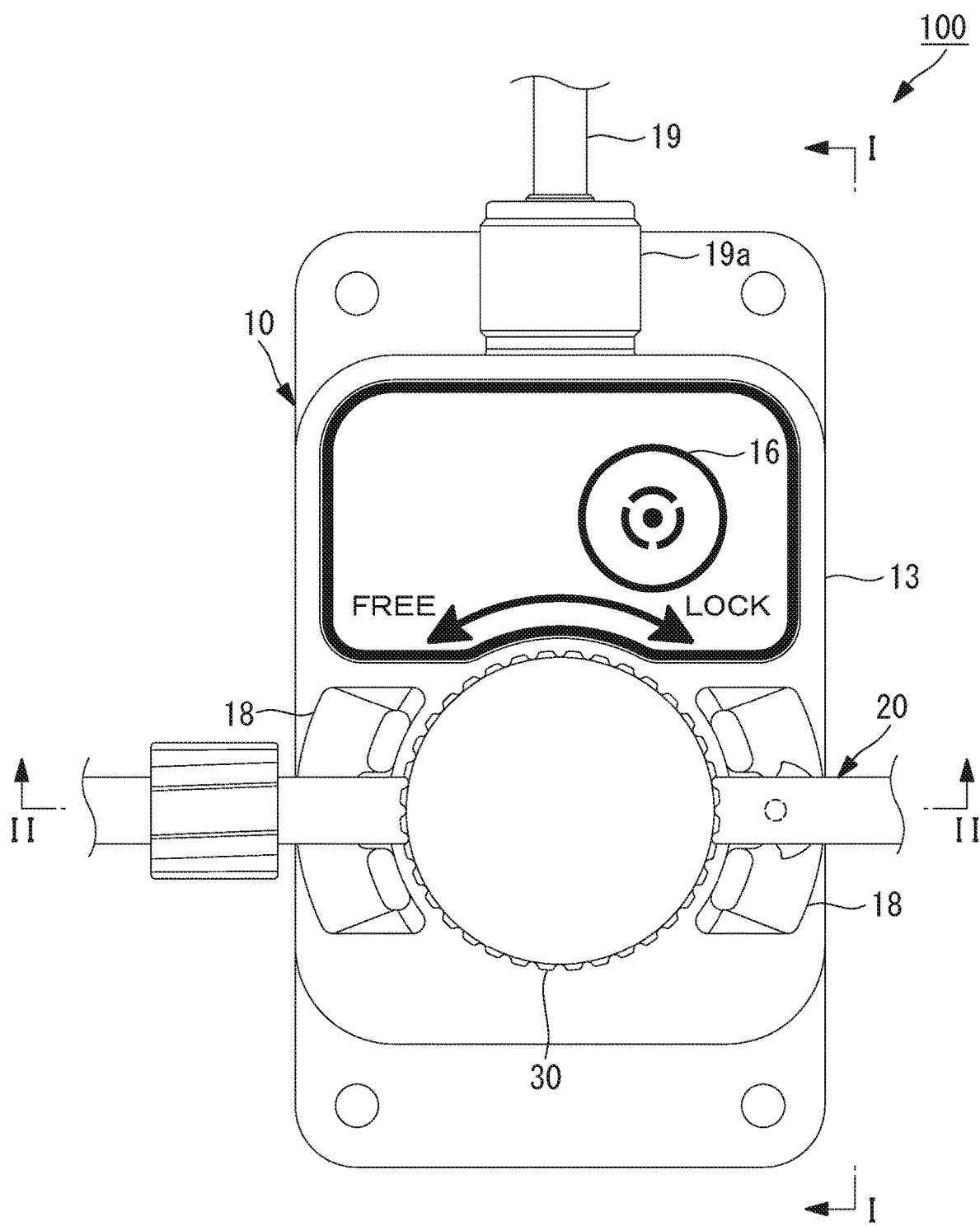
FIG. 1 is a front view showing a pressure detection device according to a first embodiment of the present disclosure.
Figure 2:
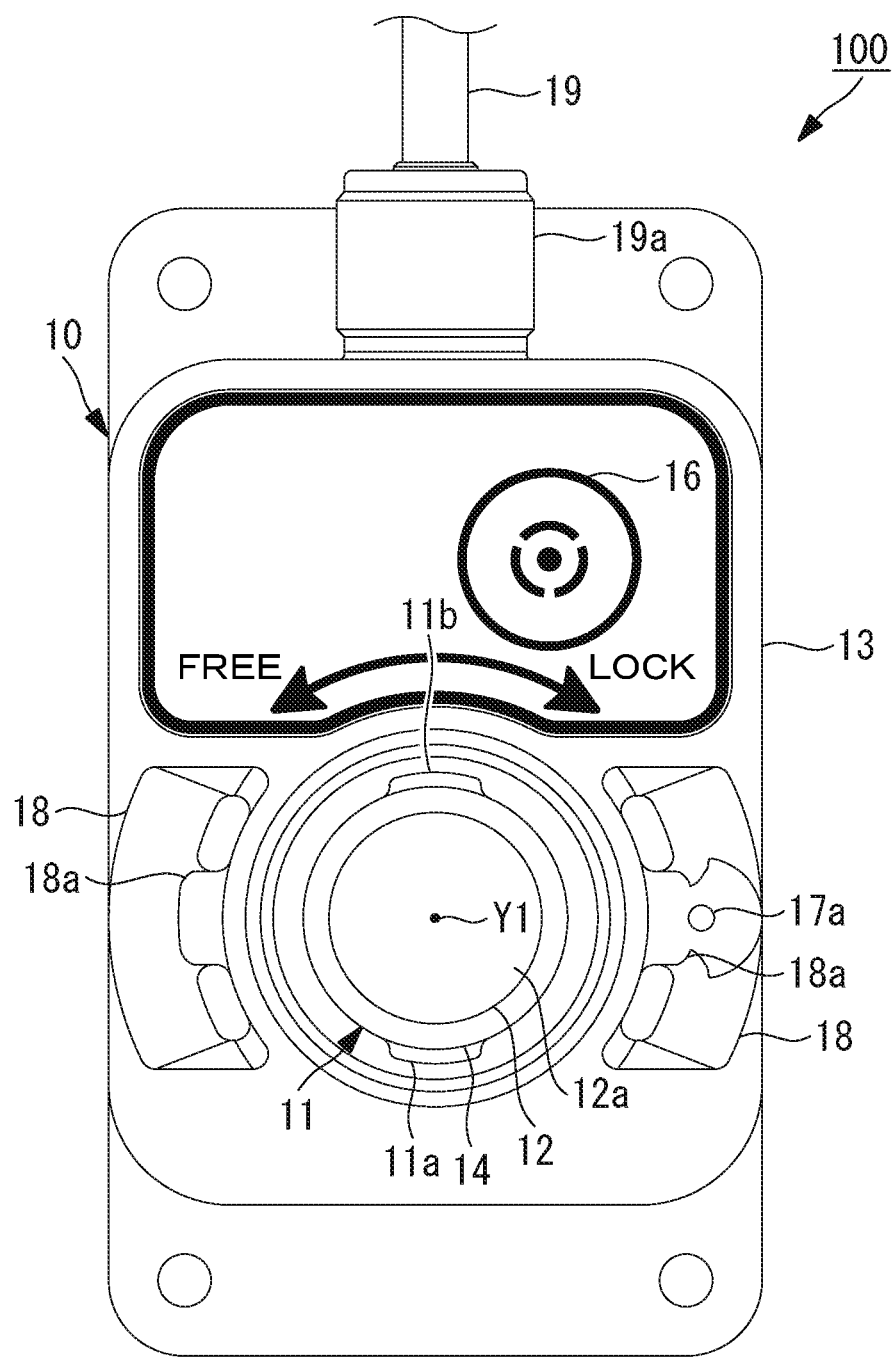
FIG. 2 is a view showing a state where a flow passage unit is removed from the pressure detection device shown in FIG. 1.

As shown in FIG. 1 and FIG. 2, the pressure detection device 100 according to this embodiment includes a pressure detection unit 10, a flow passage unit 20, and a nut (mounting mechanism) 30. The pressure detection unit 10 is mounted on an installation surface S (see FIG. 3) by fastening bolts (not shown). The flow passage unit 20 includes a flow passage 21 formed therein to allow liquid (fluid) to flow through the flow passage 21 along a straight-line flow direction from an inflow port 21a to an outflow port 21b. The nut (mounting mechanism) 30 allows the flow passage unit 20 to be removably mounted on the pressure detection unit 10.

In the pressure detection device 100 according to this embodiment, the flow passage unit 20 is mounted on the pressure detection unit 10 by the nut 30. The pressure detection device 100 is mounted on the installation surface S in a state where the flow passage unit 20 is mounted integrally on the pressure detection unit 10 by the nut 30.

Figure 3:
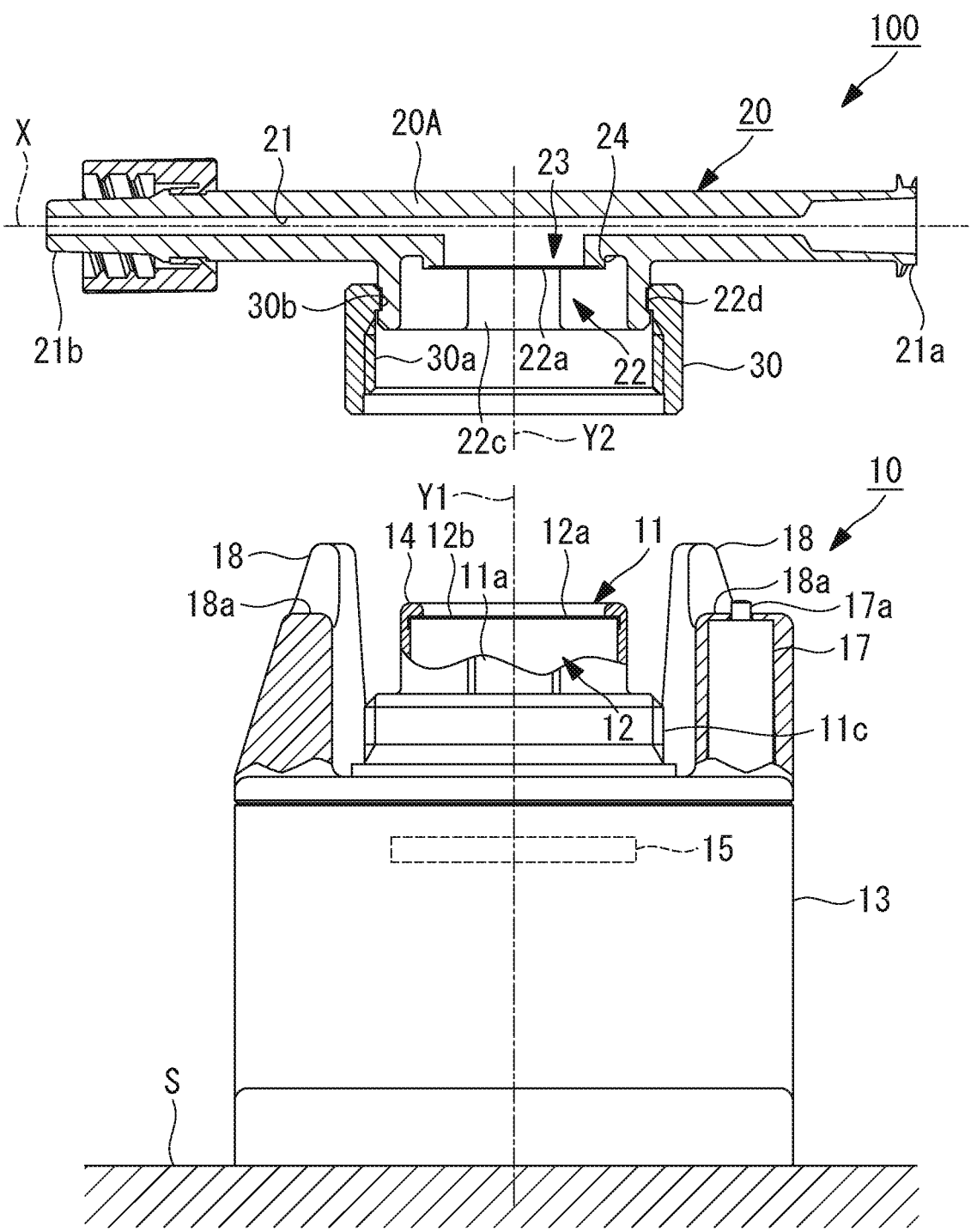
FIG. 3 is a cross-sectional view showing a state where the flow passage unit is removed from the pressure detection device shown in FIG. 1 as viewed from arrows II-II.
Figure 4:
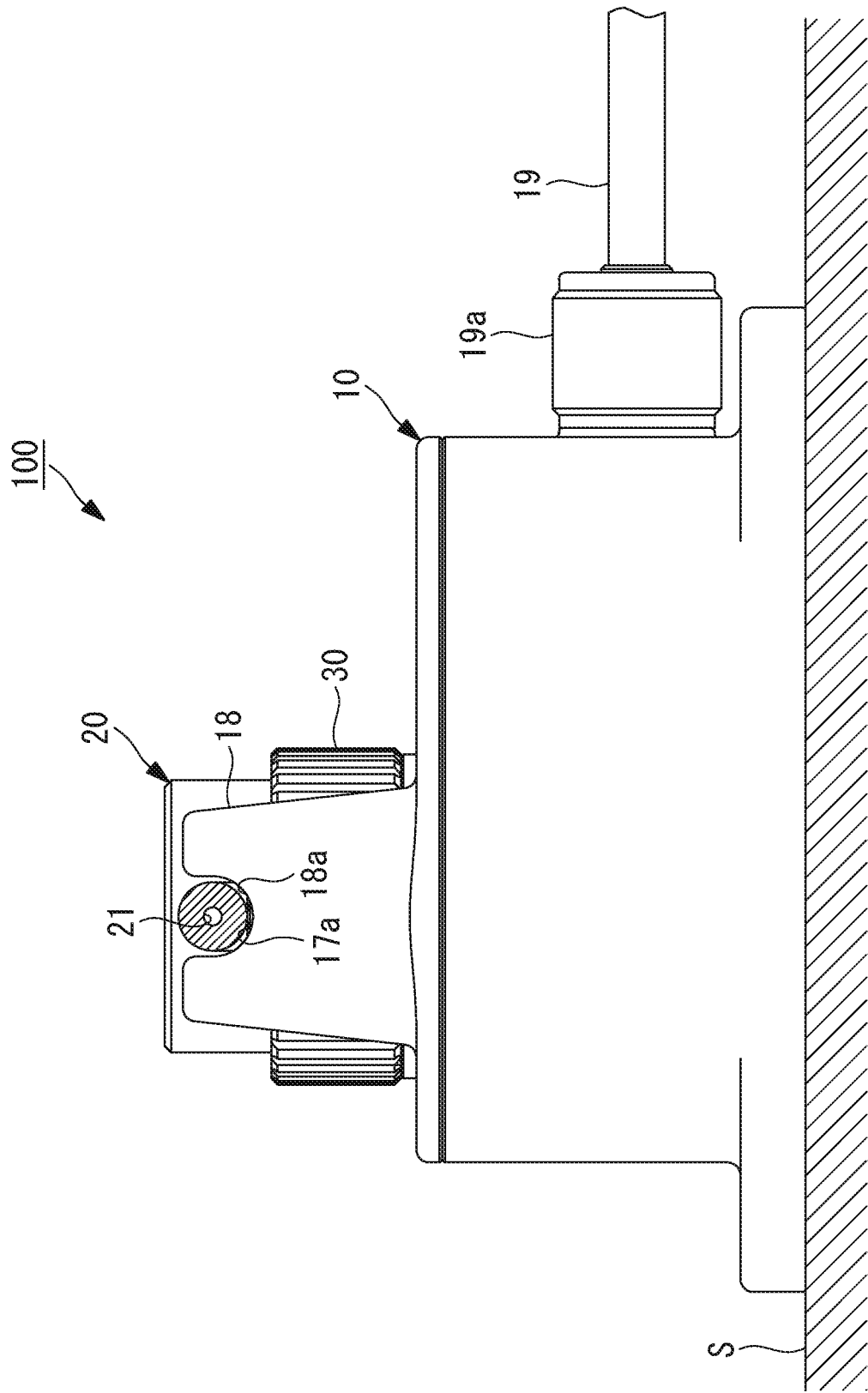
FIG. 4 is a view of the pressure detection device shown in FIG. 1 as viewed from arrows I-I.

As shown in FIG. 3 and FIG. 4, the inflow port 21a of the flow passage unit 20 is attached to an inflow pipe (not shown) that allows fluid to flow in the inflow port 21a. The outflow port 21b of the flow passage unit 20 is attached to an outflow pipe (not shown) that allows fluid flowing out from the outflow port 21b to flow therethrough. The pressure detection unit 10 detects pressure of fluid flowing through the flow passage 21 from the inflow port 21a to the outflow port 21b. In this embodiment, fluid means liquid such as blood or a dialysate.

As shown in FIG. 3, the pressure detection unit 10 includes a body 13 mounted on the installation surface S. As shown in FIG. 2 and FIG. 3, on the body 13 of the pressure detection unit 10, a cable 19 is mounted via a cable mounting nut 19a. The cable 19 electrically connects a pressure sensor 12 arranged in the body 13 to a control device (not shown) arranged outside the body 13.

Next, with reference to FIG. 1 to FIG. 3, the pressure detection unit 10 is described in detail. The pressure detection unit 10 shown in FIG. 1 to FIG. 3 detects pressure transmitted to a pressure detecting surface 12a.

As shown in FIG. 1 to FIG. 3, the pressure detection unit 10 includes the body 13, the pressure sensor 12 arranged in the body 13, a sensor holder 14 that holds the pressure sensor 12 onto the body 13, a sensor board (setting unit) 15 that transmits power and an electric signal between the pressure sensor 12 and the cable 19, a zero-point adjustment switch 16 that performs a zero-point adjustment of the pressure sensor 12, a mounting detection sensor (detection unit) 17 that detects a state where the flow passage unit 20 has been mounted, and a pair of guide members (guide units) 18 that guides the flow passage 21 of the flow passage unit 20 to a predetermined mounting position.

Figure 5:
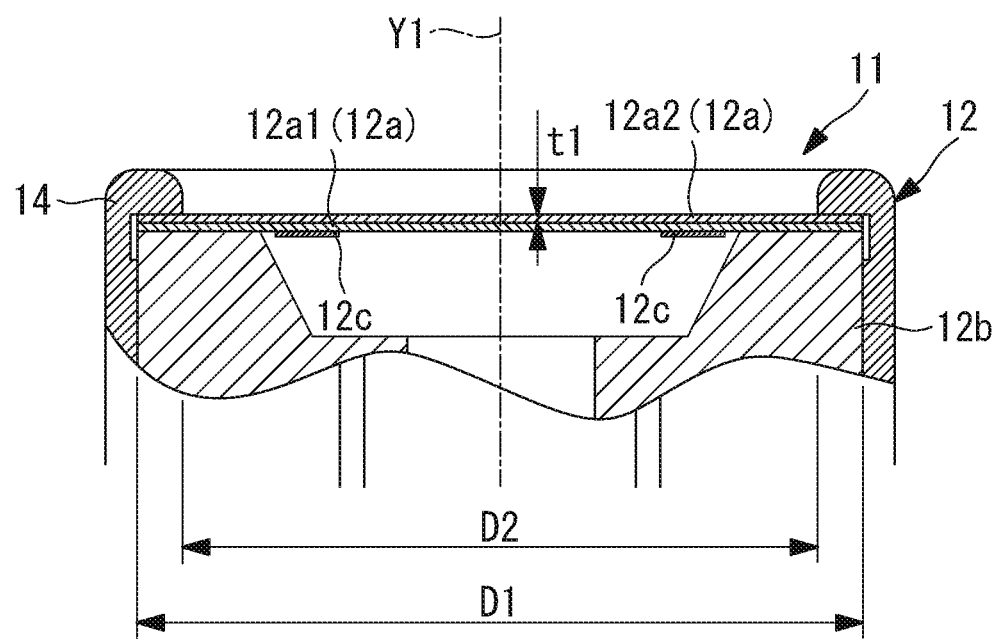
FIG. 5 is a partially enlarged view of the flow passage unit shown in FIG. 3.

As shown in FIG. 5, the pressure sensor 12 includes the pressure detecting surface 12a, a base 12b on which the pressure detecting surface 12a is mounted, and strain resistances 12c attached to the pressure detecting surface 12a. The pressure sensor 12 is a strain sensor that outputs pressure signals corresponding to changes in resistance values of the strain resistances 12c which deform with the pressure detecting surface 12a corresponding to transmitted pressure. In the base 12b, a through hole (not shown) is formed to communicate with the pressure detecting surface 12a, so that one side of the pressure detecting surface 12a (the base 12b side in FIG. 5) is maintained in atmospheric pressure. Accordingly, the pressure sensor 12 detects a gauge pressure based on atmospheric pressure.

The pressure detecting surface 12a includes a diaphragm (sensing surface) 12a1 mounted on the base 12b and a sliding sheet (sliding layer) 12a2. The diaphragm 12a1 is formed in a thin film shape and formed of a material (for example, sapphire) having corrosion resistance and is joined to the base 12b by an adhesive. The diaphragm 12a1 is arranged on a plane orthogonal to an axis Y1 and is in a circular planar form having a diameter D1 centered at the axis Y1.

The sliding sheet 12a2 is a thin-film sheet member having a sliding property (a slippery property) for when the pressure detecting surface 12a comes in contact with a diaphragm (pressure transmitting surface 22a) of the flow passage unit 20. The sliding sheet 12a2 is formed of a synthetic resin having a sliding property, such as a fluororesin material (for example, polytetrafluoroethylene (PTFE) or (Perfluoroalkoxy alkane (PFA)).

The sliding sheet 12a2 may be formed of a resin material having self-lubricity (for example, polyvinylidene fluoride (PVDF), polyethylene (PE), or polyacetal (POM)). A thickness t1 of the sliding sheet 12a2 is preferably set to not less than 0.05 mm and not more than 0.20 mm, so as not to impair a transmitting property from the pressure transmitting surface 22a of the flow passage unit 20 to the diaphragm 12a1.

The sliding sheet 12a2 is arranged on a plane orthogonal to the axis Y1 and is in a circular planar form having the diameter D1 centered at the axis Y1. The lower surface of the sliding sheet 12a2 is joined to an entire region of the upper surface of the diaphragm 12a1 (on the side with no strain resistances 12c attached). The sliding sheet 12a1 is joined to the diaphragm 12a1, for example, by an adhesive, or is fused to the diaphragm 12a1. For the fusing process, a thin-film sheet (which is thin enough relative to the thickness of the sliding sheet 12a2) is arranged between the sliding sheet 12a2 and the diaphragm 12a1. The thin-film sheet is formed of a synthetic resin such as a fluororesin material (for example, PTFE or PFA). Then, the thin-film sheet is heated to the melting point or above so as to be melted.

The sensor holder 14 is formed in a cylindrical shape about the axis Y1. On an outer peripheral surface of the sensor holder 14, positioning protrusions (first positioning portions) 11a, 11b are formed. An inner diameter D2 of an upper end of the sensor holder 14 is smaller than an outer diameter D1 of the pressure sensor 12, so that the sensor holder 14 can hold the pressure sensor 12 not to be removed in the upward direction.

The sensor board 15 includes an amplifier circuit (not shown) that amplifies a pressure signal output from the pressure sensor 12, an interface circuit that transmits the pressure signal amplified by the amplifier circuit to a pressure signal line (not shown) of the cable 19, a power supply circuit (not shown) that transmits a power supply voltage supplied from outside via the cable 19 to the pressure sensor 12, a zero-point adjustment circuit (not shown) that performs a zero-point adjustment when the zero-point adjustment switch 16 is pressed. The zero-point adjustment circuit performs an adjustment such that, at the time when the zero-point adjustment switch 16 is pressed, a pressure signal output from the pressure sensor 12 is set as a reference value (for example, zero).

As shown in FIG. 3, the pressure sensor 12 and the sensor holder 14 of the pressure detection unit 10 are projected upward from the body 13 along the axis Y1 to form a projection 11. On the top of the projection 11, the pressure detecting surface 12a is arranged. On an outer peripheral surface of the projection 11, positioning protrusions 11a, 11b are formed. The positioning protrusions 11a, 11b extend in an axis direction along the axis Y1. As shown in FIG. 2 and FIG. 3, the pressure detecting surface 12a is arranged on a plane orthogonal to the axis Y1. Thus, the positioning protrusions 11a, 11b are formed on the outer peripheral surface of the projection 11 so as to extend in the axis direction along the axis Y1 orthogonal to the pressure detecting surface 12a.

FIG. 2 is a view showing a state where the flow passage unit 20 is removed from the pressure detection device 100 shown in FIG. 1. As shown in FIG. 2, the positioning protrusions 11a, 11b are formed on the outer peripheral surface of the projection 11 at two locations spaced apart by 180° about the axis Y1. In a state where the flow passage unit 20 is not mounted on the pressure detection unit 10 as shown in FIG. 2, the pressure detecting surface 12a of the pressure sensor 12 is exposed to the outside.

The mounting detection sensor 17 detects the state where the flow passage unit 20 has been mounted on the pressure detection unit 10. As shown in FIG. 2 and FIG. 3, on the upper end of the mounting detection sensor 17, a detecting protrusion 17a is provided. The detecting protrusion 17a is urged vertically upward by an urging member such as a spring (not shown). The mounting detection sensor 17 excluding the detecting protrusion 17a is arranged in a state of being housed in a guide member 18, which is described below.

Guide members 18 include grooves 18a that guide the flow passage 21 to a predetermined mounting position when the flow passage unit 10 is mounted on the pressure detection unit 10. The guide members 18 are provided in pairs symmetrically on the axis Y1. The respective guide members 18 in pairs guide a part of the flow passage 21 on the side of the inflow port 21a and a part of the flow passage 21 on the side of the outflow port 21b to the predetermined mounting position. FIG. 4 shows the predetermined mounting position where an outer peripheral surface of the flow passage 21 is surrounded by the groove 18 of the guide member 18a and a lower end of the flow passage 21 presses the detecting protrusion 17a of the mounting detection sensor 17 downward.

Next, with reference to FIG. 3 and FIGS. 6 to 9, the flow passage unit 20 is described in detail.

As shown in FIGS. 6 to 9, the flow passage unit 20 includes a body 20A formed with the flow passage 21, the recess 22, and the opening 23. The flow passage 21 allows liquid to flow therethrough in a flow direction extending along the axis X (first axis) from the inflow port 21a to the outflow port 21b. The recess 22 includes the pressure transmitting surface 22a arranged on the bottom thereof, and positioning grooves 22b, 22c formed on an inner peripheral surface thereof. The opening 23 opens in a direction along an axis (second axis) Y2 orthogonal to the axis X.

Figure 6:
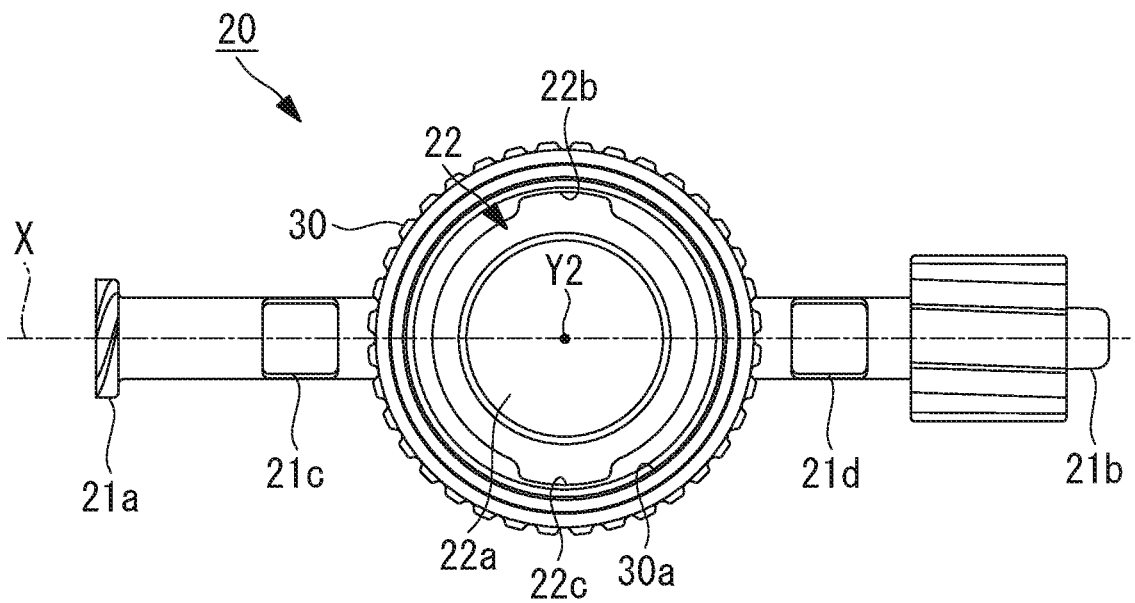
FIG. 6 is a back view of the flow passage unit shown in FIG. 1.
Figure 7:
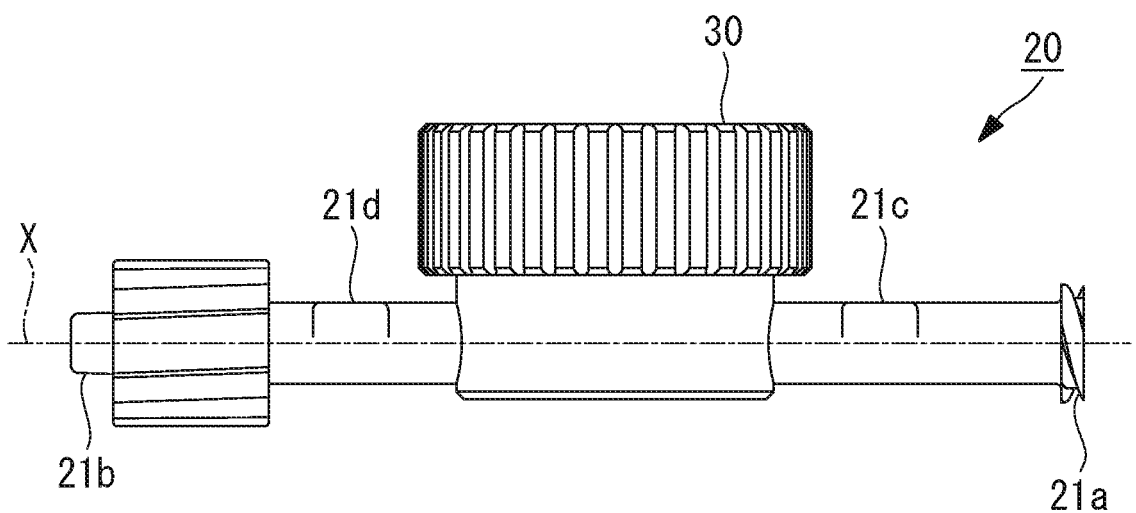
FIG. 7 is a bottom view of the flow passage unit shown in FIG. 1.
Figure 8:
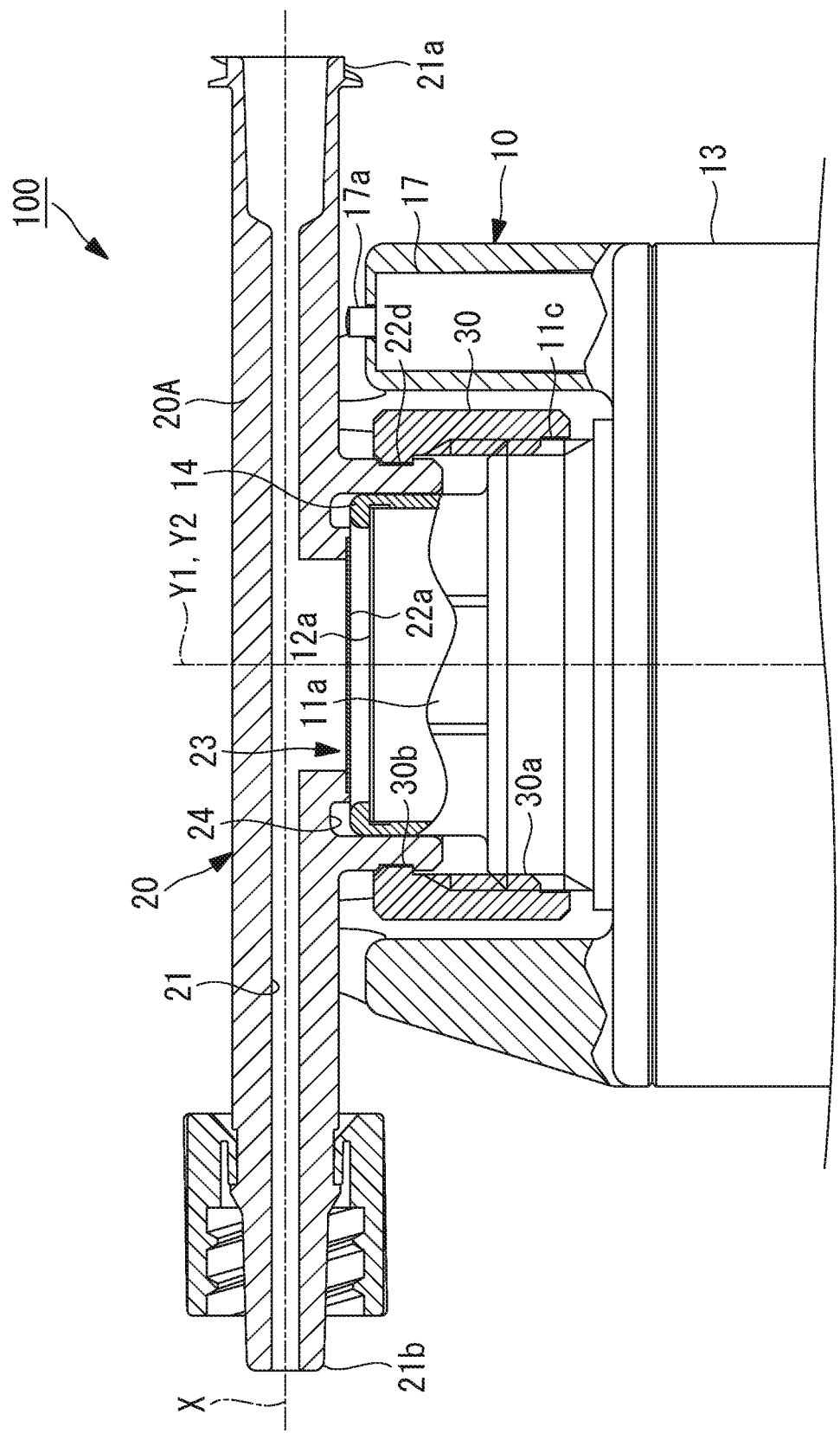
FIG. 8 is a cross-sectional view showing a state where the flow passage unit is in process of being mounted on the pressure detection device shown in FIG. 1 as viewed from arrows II-II.

As shown in FIG. 3, FIG. 6, and FIG. 8, the pressure transmitting surface 22a is arranged on a horizontal plane orthogonal to the axis Y2. Thus, the positioning grooves 22b, 22c are formed on the inner peripheral surface of the recess 22 so as to extend in the axis direction along the axis Y2 orthogonal to the pressure transmitting surface 22a.

The pressure transmitting surface 22a is a diaphragm formed in a thin film shape and formed of a material (for example, polycarbonate (PC)) having corrosion resistance. The pressure transmitting surface 22a is formed in a circular shape in a planar view and is centered at the axis Y2. An outer peripheral edge of the pressure transmitting surface 22a is joined to the body 20A by bonding or welding so as to close the opening 23. Consequently, liquid introduced to the flow passage 21 does not flow out of the flow passage 21. Since the pressure transmitting surface 22a is formed in a thin film shape, the pressure transmitting surface 22a is displaced along the axis Y2 by pressure of liquid introduced into the flow passage 21.

In a state shown in FIG. 8 where the flow passage unit 20 is in process of being mounted on the pressure detection unit 10, the pressure transmitting surface 22a of the flow passage unit 20 is spaced apart from the pressure detecting surface 12a of the pressure detection unit 10. On the other hand, in a state shown in FIG. 9 where the flow passage unit 20 has been mounted on the pressure detection unit 10, the pressure transmitting surface 22a of the flow passage unit 20 is in contact with the pressure detecting surface 12a of the pressure detection unit 10. Thus, the pressure transmitting surface 22a transmits pressure of fluid flowing through the flow passage 21 to the pressure detecting surface 12a.

FIG. 6 is a back view of the flow passage unit 20 shown in FIG. 1. As shown in FIG. 6, the positioning grooves 22b, 22c are formed on the inner peripheral surface of the recess 22 at two locations spaced apart by 180° about the axis Y2. In a state shown in FIG. 6 where the flow passage unit 20 is not mounted on the pressure detection unit 10, the pressure transmitting surface 22a is exposed to the outside. Nevertheless, an operator has a less risk of touching the pressure transmitting surface 22a, since the pressure transmitting surface 22a is arranged on the bottom of the recess 22.

As shown in FIG. 3, on an outer peripheral surface of the recess 22 of the flow passage unit 20, an endless annular groove 22d is formed to extend about the axis Y2. On an inner peripheral surface of the nut 30, an endless annular protrusion 30b is formed to extend about the axis Y2. The nut 30 is formed of an elastically deformable material (for example, a resin material). When the nut 30 is pressed toward the annular groove 22d formed on the outer peripheral surface of the recess 22, the annular protrusion 30b is engaged with the annular groove 22d.

In a state shown in FIG. 3 where the annular protrusion 30b is engaged with the annular groove 22d, a minute gap is formed between an outer peripheral surface of the annular protrusion 30b and an inner peripheral surface of the annular groove 22d. Accordingly, the nut 30, which is mounted on the flow passage unit 20, is rotatable about the axis Y1 relative to the projection 11. This enables an operator to rotate the nut 30 about the axis Y1 in a state where the pressure detection unit 10 is fixed to the installation surface S.

As shown in FIG. 3, the nut 30 is an annular member where a female thread 30a extending about the axis Y2 is formed on an inner peripheral surface thereof. The nut 30 is a mechanism by which the flow passage unit 20 is removably mounted on the pressure detection unit 10 by fastening/releasing the female thread 30a to/from a male thread 11c which is formed on the outer peripheral surface of the projection 11 of the pressure detection unit 10.

Next, the mounting work to mount the flow passage unit 20 on the pressure detection unit 10 is described below.

According to the following procedures, an operator mounts the flow passage unit 20 on the pressure detection unit 10 which is mounted on the installation surface S.

First, as shown in FIG. 3, the flow passage unit 20 is arranged such that the axis Y1 which is the center axis of the pressure detection unit 10 is brought into line with the axis Y2 which is the center axis of the flow passage unit 20, and the positions of the positioning protrusions 11a, 11b about the axis Y1 are made to coincide with the positions of the positioning grooves 22b, 22c about the axis Y2.

FIG. 8 shows a state where the projection 11 of the pressure detection unit 10 is inserted into the recess 22 of the flow passage unit 20. At this point, as shown in FIG. 8, the pressure detecting surface 12a arranged on the top of the projection 11 is not in contact with but is spaced apart from the pressure transmitting surface 22a arranged on the bottom of the recess 22. In a state shown in FIG. 8, a tip of the female thread 30a formed on the inner peripheral surface of the nut 30 is in contact with a tip of the male thread 11c formed on the outer peripheral surface of the pressure detection unit 10.

As such, the tip of female thread 30a in the axis Y2 direction is in contact with the tip of the male thread 11c in the axis Y1 direction in a state where a part of the positioning protrusions 11a, 11b in the axis Y1 direction is engaged with a part of the positioning grooves 22b, 22c in the axis Y2 direction. Accordingly, the female thread 30a and the male thread 11c start to fasten to each other in a state where the positions of the inflow port 21a and the outflow port 21b of the flow passage 21 formed in the flow passage unit 20 are set to predetermined positions relative to the pressure detection unit 10.

In the state shown in FIG. 8, the female thread 30a is in contact with the male thread 11c. In such a state, even if an operator holds the flow passage unit 20 and applies force in a direction to move the flow passage unit 20 toward the pressure detection unit 10, the operator cannot move the flow passage unit 20 any further to the pressure detection unit 10. At this point, as shown in FIG. 8, the pressure detecting surface 12a arranged on the top of the projection 11 is not in contact with but is spaced apart from the pressure transmitting surface 22a arranged on the bottom of the recess 22.

Thus, in the pressure detection device 100 according to this embodiment, even if an operator holds the flow passage unit 20 and applies force in the direction to move the flow passage unit 20 toward the pressure detection unit 10, the pressure detecting surface 12a cannot come in contact with the pressure transmitting surface 22a. This can avoid a careless failure caused by the operator in which the pressure detecting surface 12a and the pressure transmitting surface 22a come in contact with one another and get damaged.

The operator rotates the nut 30 about the axis Y1 in the fastening direction (indicated by "LOCK" in FIG. 1 and FIG. 2) while holding the flow passage unit 20. In this way, the female thread 30a of the nut 30 and the male thread 11c of the pressure detection unit 10 are fastened to each other. By fastening the female thread 30a of the nut 30 and the male thread 11c of the pressure detection unit 10 to each other, the pressure transmitting surface 22a gradually approaches the pressure detecting surface 12a and eventually comes into contact with the pressure detecting surface 12a to reach a state shown in FIG. 9.

Figure 9:
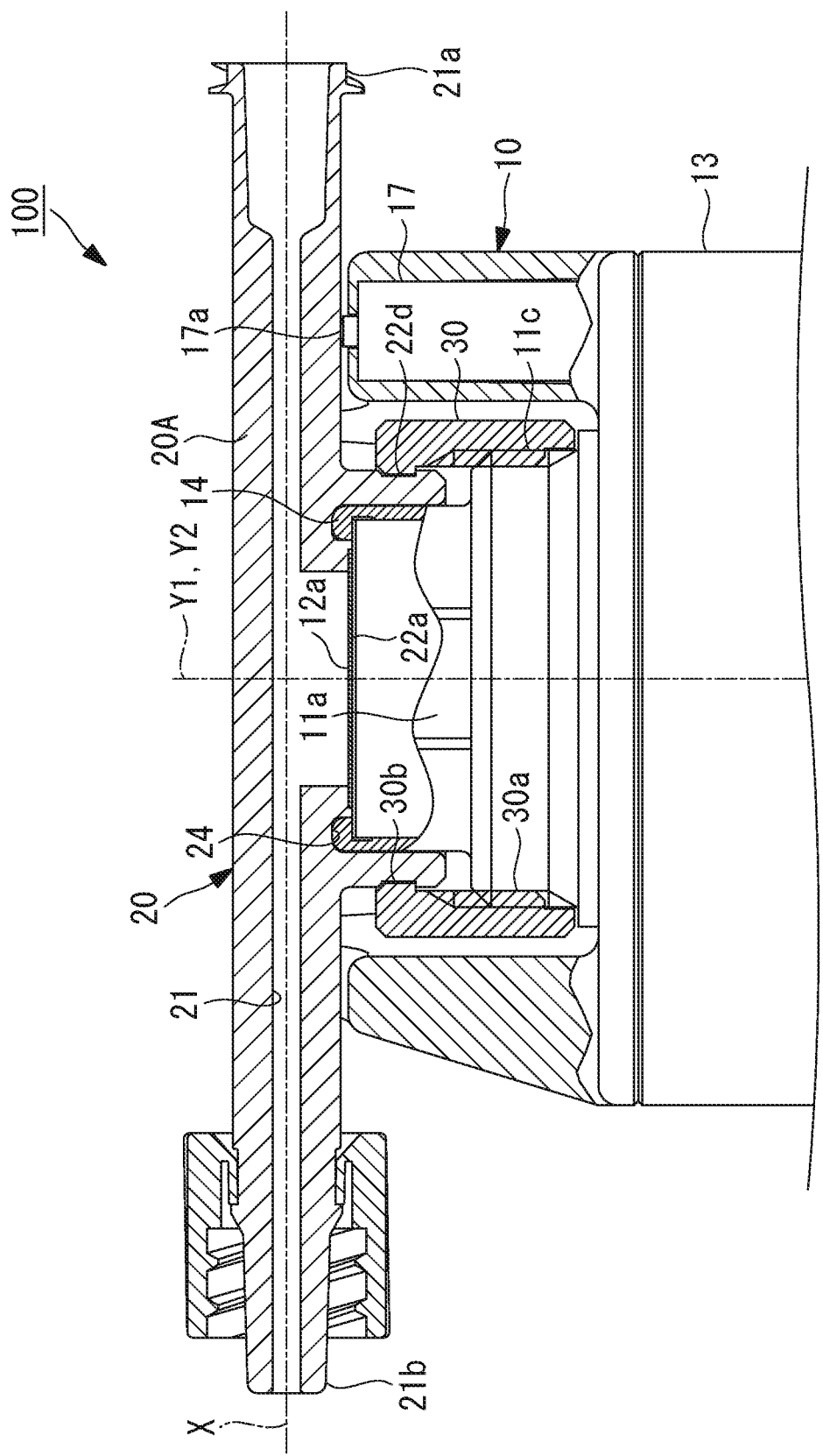
FIG. 9 a cross-sectional view showing a state where the flow passage unit has been mounted on the pressure detection device shown in FIG. 1 as viewed from arrows II-II.

As shown in FIG. 8 and FIG. 9, in the body 20A of the flow passage unit 20, a circular annular groove 24 is formed on an outer peripheral side of the opening 23 relative to the axis Y2. The circular annular groove 24 extends along the axis Y2, and houses a tip part of the sensor holder 14. As shown in FIG. 9, when the tip part of the sensor holder 14 comes in contact with the circular annular groove 24, the pressure transmitting surface 22a is regulated so as not to approach the pressure detecting surface 12a any further. This can prevent a failure in which the pressure transmitting surface 22a excessively presses the pressure detecting surface 12a to mutually get damaged.

The pressure detecting surface 12a includes the sliding sheet 12a2 having a sliding property. When the pressure transmitting surface 22a gradually approaches to come in contact with the pressure detecting surface 12a, the pressure transmitting surface 22a slides relative to the pressure detecting surface 12a. Thus, even with variations in mounting work performed by operators, the constant state of contact can be maintained between the pressure transmitting surface 22a and the pressure detecting surface 12a, thereby reducing changes in the pressure detecting property of the pressure detection unit 10.

In the states shown in FIG. 8 and FIG. 9, the positioning protrusions 11a, 11b are engaged with the positioning grooves 22b, 22c. In such states, even if the nut 30 is rotated about the axis Y1, the flow passage unit 20 is not rotated about the axis Y2 but is maintained at the position about the Y2. In this way, the flow passage unit 20 can be mounted on the pressure detection unit 10 without bringing the pressure detecting surface 12a carelessly into contact with the pressure transmitting surface 22a and without allowing the flow passage unit 20 to rotate about the axis Y2.

The above are procedures to mount the unused flow passage unit 20 on the pressure detection unit 10. To remove the used flow passage unit 20 from the pressure detection unit 10 should be the reverse of the above procedures. Specifically, an operator rotates the nut 30 about the axis Y1 in the fastening release direction (indicated by "FREE" in FIG. 1 and FIG. 2) while holding the flow passage unit 20 in the state shown in FIG. 9. In this way, the female thread 30a of the nut 30 and the male thread 11c of the pressure detection unit 10 are released from each other.

The pressure detection device 100 according to this embodiment provides the following effects.

In the pressure detection device 100 according to this embodiment, the flow passage unit 20 is removably mounted on the pressure detection unit 10. When liquid flowing through the flow passage 21 is changed, the used flow passage unit 20 can be removed from the pressure detection unit 10 to mount a new unused one on the pressure detection unit 10. Consequently, there is no need to perform time-consuming cleaning of the flow passage 21 when liquid flowing through the flow passage 21 is changed, thereby enabling prompt work. Further, use of the new unused flow passage unit 20 can improve safety.

In the pressure detection device 100 according to this embodiment, the pressure transmitting surface 12a includes the sliding sheet 12a2 that increases a sliding property for when the pressure detecting surface 12a comes in contact with the pressure transmitting surface 22a. Consequently, the sliding sheet 12a2 and the pressure transmitting surface 22a, which is to be in contact with the sliding sheet 12a2, slidably come in contact with one another, when the flow passage unit 20 is mounted on the pressure detection unit 10 by the nut 30 so as to bring the pressure transmitting surface 22a into contact with the pressure detecting surface 12a.

Further, the presence of the sliding sheet 12a2 can maintain the constant state of contact between the pressure transmitting surface 22a and the pressure detecting surface 12a, corresponding to displacement of the pressure transmitting surface 22a caused by changes in fluid pressure. Thus, even with variations in mounting work performed by operators, the constant state of contact can be maintained between the pressure transmitting surface 22a and the pressure detecting surface 12a, thereby reducing changes in the pressure detecting property of the pressure detection unit 10.

In the pressure detection device 100 according to this embodiment, the opening 23 communicating with the flow passage 21 is closed by the pressure transmitting surface 22a. Thus, the pressure transmitting surface 22a is displaced along the axis Y2 by pressure of liquid that resides in a space closed by the pressure transmitting surface 22a. Such displacement of the pressure transmitting surface 22a along the axis Y2 is transmitted to the pressure detecting surface 12a arranged in contact with the pressure transmitting surface 22a and is detected as a pressure value.

In the pressure detection device 100 according to this embodiment, the pressure transmitting surface 22a is arranged on the bottom of the recess 22 of the flow passage unit 20. This can prevent a failure in which operators mistakenly touch the pressure transmitting surface 22a when replacing the flow passage unit 20 and a failure in which the pressure transmitting surface 22a comes in contact with another member and gets damaged.

Second Embodiment

Figure 10:
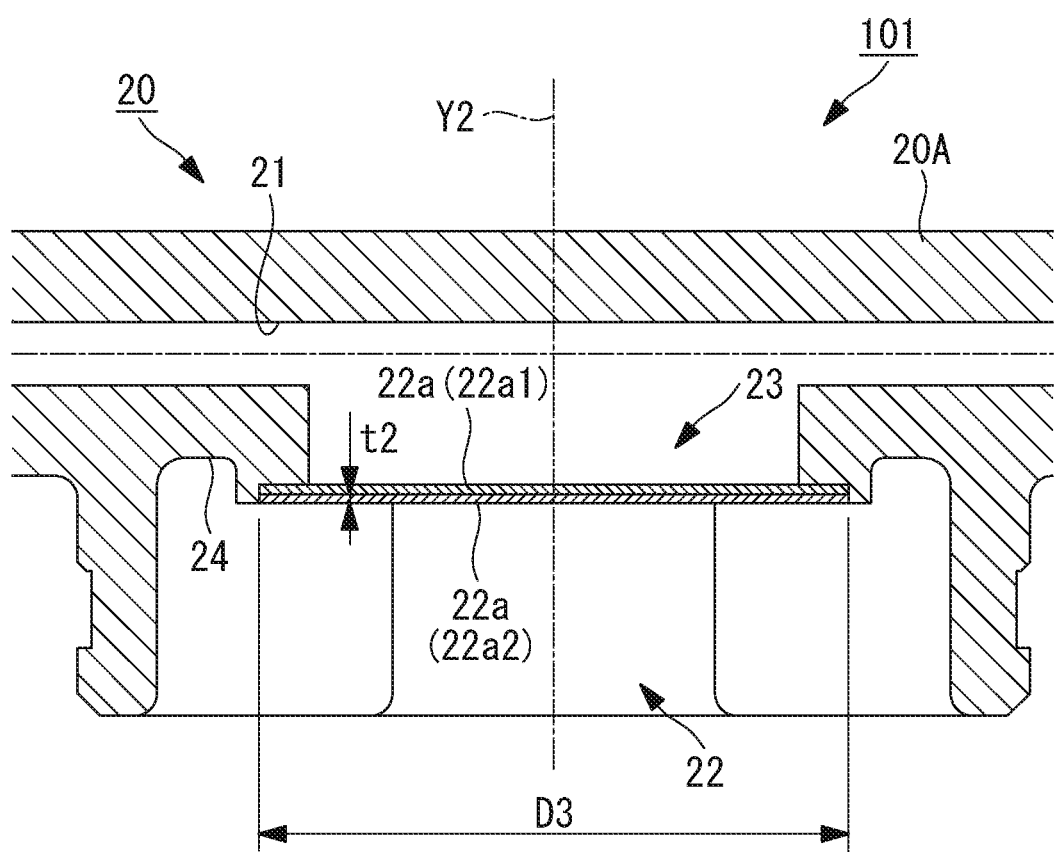
FIG. 10 is a partially enlarged view of a flow passage unit according to a second embodiment.

Next, with reference to the drawings, a pressure detection device 101 according to a second embodiment of the present disclosure is described below. FIG. 10 is a partially enlarged view of a flow passage unit 20 according to this embodiment.

In the pressure detection device 100 according to the first embodiment, the pressure detecting surface 12a of the pressure detection unit 10 includes the sliding sheet 12a2 having a sliding property for when the pressure detecting surface 12a comes in contact with the pressure transmitting surface 22a of the flow passage unit 20. On the other hand, in the pressure detection device 101 according to the second embodiment, the pressure transmitting surface 22a of the flow passage unit 20 includes a sliding sheet 22a2 having a sliding property for when the pressure transmitting surface 22a comes in contact with the pressure detecting surface 12a of the pressure detection unit 10.

The pressure transmitting surface 22a includes a diaphragm (pressure receiving surface) 22a1 and the sliding sheet (sliding layer) 22a2. The diaphragm 22a1 is formed in a thin film shape and is joined to the body 20A so as to close the opening 23. The thin-film diaphragm 22a1 is formed of a resin material (for example, PC) and is joined to the body 20A by an adhesive. The diaphragm 22a1 is arranged on a plane orthogonal to an axis Y2 and is in a circular planar form having a diameter D3 centered at the axis Y2.

The sliding sheet 22a2 is a thin-film sheet member having a sliding property for when the pressure transmitting surface 22a comes in contact with the pressure detecting surface 12a of the pressure detection unit 10. The sliding sheet 22a2 is formed of a synthetic resin having a sliding property, such as a fluororesin material (for example, PTFE or PFA). The sliding sheet 22a2 may be formed of a resin material having self-lubricity (for example, PVDF, PE, or POM). A thickness t2 of the sliding sheet 22a2 is preferably set to not less than 0.05 mm and not more than 0.20 mm, so as not to impair a transmitting property from the diaphragm 22a1 to the pressure detecting surface 12a of the pressure detection unit 10.

The sliding sheet 22a2 is arranged on a plane orthogonal to the axis Y2 and is in a circular planar form having the diameter D3 centered at the axis Y2. The upper surface of the sliding sheet 22a2 is joined to an entire region of the lower surface of the diaphragm 22a1 (on the side not in contact with liquid flowing through the flow passage 21). The sliding sheet 22a1 is joined to the diaphragm 22a1, for example, by an adhesive, or is fused to the diaphragm 22a1. For the fusing process, a thin-film sheet (which is thin enough relative to the thickness of the sliding sheet 22a2) is arranged between the sliding sheet 22a2 and the diaphragm 22a1. The thin-film sheet is formed of a synthetic resin such as a fluororesin material (for example, PTFE or PFA). Then, the thin-film sheet is heated to the melting point or above to be melted.

In this embodiment, the pressure detecting surface 12a of the pressure detection unit 10 includes the sliding sheet 12a2 as described in the first embodiment. However, another aspect may be employed. For example, in the second embodiment, the pressure detecting surface 12a of the pressure detection unit 10 may not include the sliding sheet 12a2 described in the first embodiment and may only include the diaphragm 12a1. In other words, at least one of the pressure detecting surface 12a and the pressure transmitting surface 22a may include a sliding layer having a sliding property for when the pressure detecting surface 12a and the pressure transmitting surface 22a come in contact with one another.

In the above-described pressure detection device 101 according to this embodiment, the thin-film sliding sheet 22a2 is joined to the thin-film diaphragm 22a1 included in the pressure transmitting surface 22a of the flow passage unit 20, so that the sliding layer can be formed. There is no need to perform time-consuming cleaning of the flow passage 21 when liquid flowing through the flow passage 21 is changed, thereby enabling prompt work. Further, use of a new unused flow passage unit 20 can improve safety.

Another Embodiment

In the first embodiment, the pressure detecting surface 12a is formed by joining the diaphragm 12a1 to the sliding sheet 12*a*2 having a sliding property. However, another aspect may be employed. For example, the sliding layer may be formed on the pressure detecting surface 12*a* by vapor-depositing a material having a sliding property on the surface of the diaphragm 12*a*1. Examples of the material include a synthetic resin having a sliding property, such as a fluororesin material (for example, PTFE or PFA), and a resin material having self-lubricity (for example, PVDF, PE, or POM). Alternatively, the sliding layer may be formed on the pressure detecting surface 12*a* by providing a surface treatment to apply a sliding property to the surface of the diaphragm 12*a*1. Examples of the surface treatment include a ceramic coating treatment and a shot blast treatment.

In the second embodiment, the pressure transmitting surface 22*a* includes the sliding sheet 22*a*2 having a sliding property to be joined to the diaphragm 22*a*1. However, another aspect may be employed. For example, the sliding layer may be formed on the pressure transmitting surface 22*a* by vapor-depositing a material having a sliding property on the surface of the diaphragm 22*a*1. Examples of the material include a synthetic resin having a sliding property, such as a fluororesin material (for example, PTFE or PFA), and a resin material having self-lubricity (for example, PVDF, PE, or POM). Alternatively, the sliding layer may be formed on the pressure transmitting surface 22*a* by providing a surface treatment to apply a sliding property to the surface of the diaphragm 22*a*1. Examples of the surface treatment include a ceramic coating treatment and a shot blast treatment.

In the above description, the sliding sheet 12*a*2 is joined by an adhesive to the diaphragm 22*a*1, or is fused by a fusing sheet to the diaphragm 22*a*1. However, another aspect may be employed. For example, the sliding sheet 12*a*2 and the diaphragm 12*a*1 may be arranged with grease interposed therebetween so that no air is contained therebetween. In this case, the sliding sheet 12*a*2 and the diaphragm 12*a*1 are not integrally joined, but it is possible to maintain a good pressure transmitting property from the pressure transmitting surface 22*a* to the pressure detecting surface 12*a*.

The invention claimed is:

1. A pressure detection device comprising:
a pressure detection unit configured to detect pressure transmitted to a pressure detecting surface;
a flow passage unit including a flow passage configured to allow fluid to flow along a flow direction from an inflow port to an outflow port, and a pressure transmitting surface configured to transmit pressure of fluid flowing through the flow passage to the pressure detecting surface; and
a mounting mechanism by which the flow passage unit is removably mounted on the pressure detection unit, wherein
the pressure transmitting surface is in contact with the pressure detecting surface in a state where the flow passage unit is mounted on the pressure detection unit,
at least one of the pressure detecting surface and the pressure transmitting surface includes a sliding layer having a sliding property for when the pressure detecting surface and the pressure transmitting surface come in contact with one another, the sliding layer being formed of a fluororesin material.

2. The pressure detection device according to claim 1, wherein
the pressure detection unit includes a pressure sensor provided with the pressure detecting surface and a base configured to hold the pressure detecting surface,
the pressure detecting surface includes a sensing surface formed in a thin film shape to be mounted on the base, and
the sliding layer is one of a thin-film sheet member to be joined to the sensing surface, a layer formed of a material having a sliding property to be vapor-deposited on the sensing surface, and a layer formed by a surface treatment to apply a sliding property to the sensing surface.

3. The pressure detection device according to claim 1, wherein
the flow passage unit includes a body formed with the flow passage configured to extend along a first axis and an opening configured to communicate with the flow passage and open in a direction along a second axis orthogonal to the first axis, and
the pressure transmitting surface is joined to the body so as to close the opening.

4. The pressure detection device according to claim 3, wherein
the pressure transmitting surface includes a pressure receiving surface formed in a thin film shape to be joined to the body, and one side of the pressure receiving surface is configured to receive pressure of fluid flowing through the flow passage, and
the sliding layer is one of a thin-film sheet member to be joined to the pressure receiving surface, a layer formed of a material having a sliding property to be vapor-deposited on the pressure receiving surface, and a layer formed by a surface treatment to apply a sliding property to the pressure receiving surface.

5. The pressure detection device according to claim 1, wherein
the pressure detection unit includes a projection, and the pressure detecting surface is arranged on a top of the projection,
the flow passage unit includes a recess, and the pressure transmitting surface is arranged on a bottom of the recess, and
in a state where the projection of the pressure detection unit is inserted into the recess of the flow passage unit, the flow passage unit is mounted on the pressure detection unit by the mounting mechanism.

6. The pressure detection device according to claim 5, wherein
the mounting mechanism is a nut rotatably mounted on the flow passage unit and including a female thread formed on an inner peripheral surface of the nut,
a male thread is formed on an outer peripheral surface of the pressure detection unit, the outer peripheral surface being located on an outer peripheral side of the projection, and
by engaging the female thread with the male thread, the pressure detecting surface and the pressure transmitting surface are brought into contact with one another to reach a mounting state.

* * * * *